Figure 1:
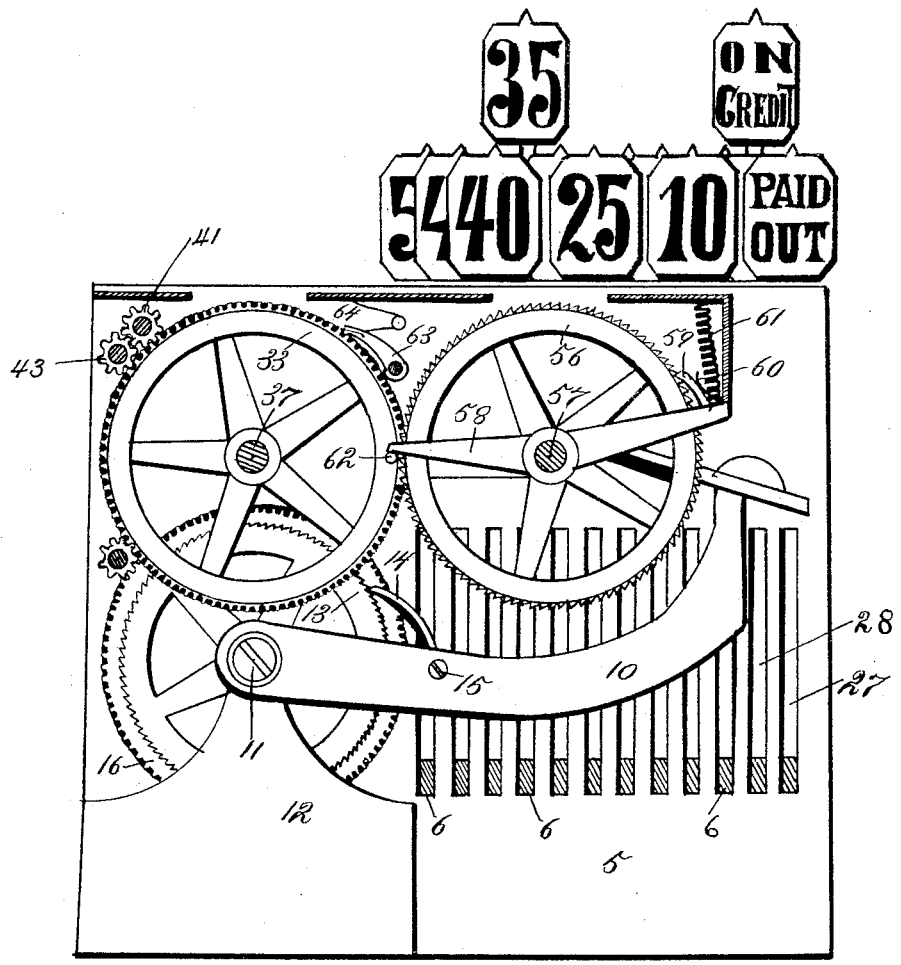

(No Model.) 3 Sheets—Sheet 1.

C. J. RYBERG.
MULTIPLE ADDING MACHINE FOR CASH REGISTERS.

No. 531,277. Patented Dec. 18, 1894.

Witnesses
Julia M. Bristol
Nellie McKibben

Inventor
Charles J. Ryberg
By his Attorneys
Bond, Adams, Pickard & Jackson (No Model.) 3 Sheets—Sheet 2.
C. J. RYBERG.
MULTIPLE ADDING MACHINE FOR CASH REGISTERS.
No. 531,277. Patented Dec. 18, 1894.
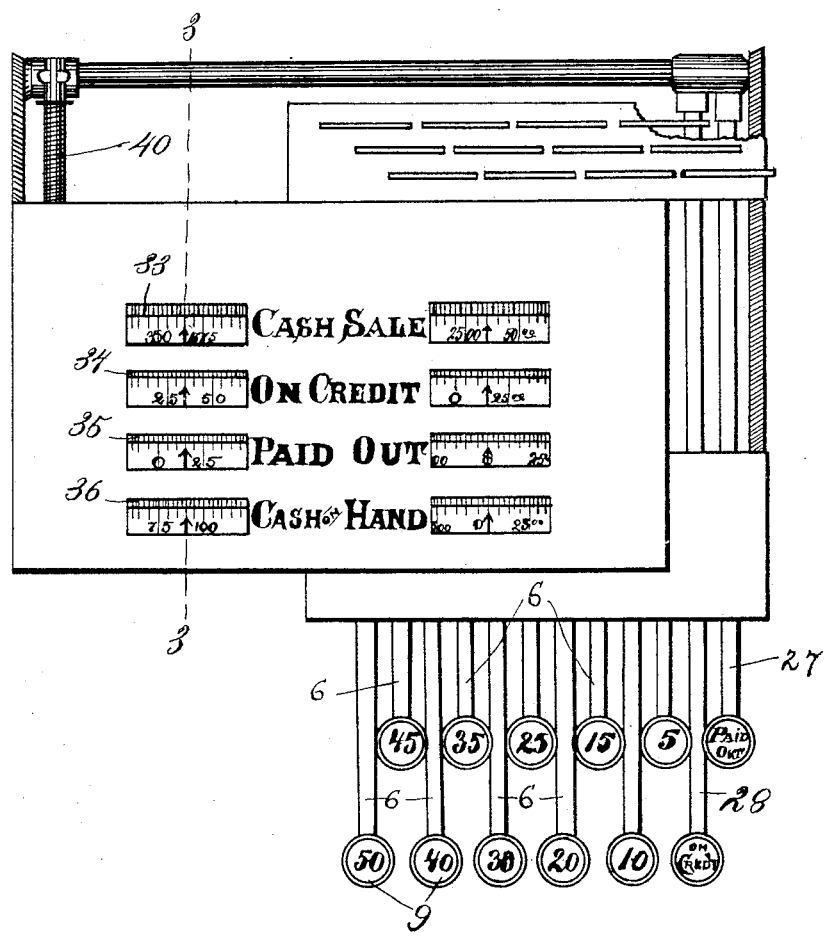

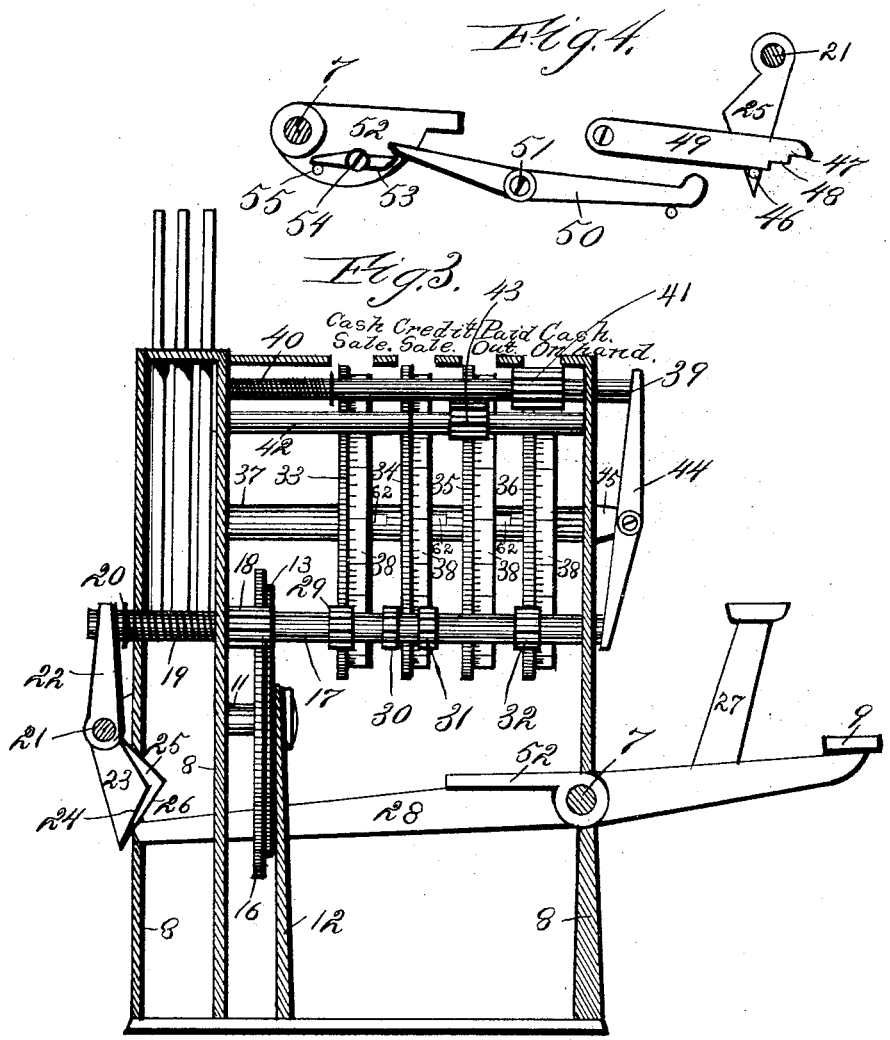

UNITED STATES PATENT OFFICE.

CHARLES J. RYBERG, OF CHICAGO, ILLINOIS.

MULTIPLE ADDING-MACHINE FOR CASH-REGISTERS.

SPECIFICATION forming part of Letters Patent No. 531,277, dated December 18, 1894.

Application filed May 13, 1893. Serial No. 474,142. (No model.)

*To all whom it may concern:*

Be it known that I, CHARLES J. RYBERG, a citizen of the United States, residing at Chicago, in the county of Cook and State of Illinois, have invented a certain new and Improved Multiple Adding-Machine for Use with Cash-Registers and Adding-Machines, of which the following is a specification, reference being had to the accompanying drawings, in which—

Figure 1 is a front view of the operating mechanism of a cash register having my adding machine attached, some of the parts being shown in section. Fig. 2 is a top or plan view of a cash register having my adding machine attached, part being in section. Fig. 3 is a vertical cross section on line 3—3 of Fig. 2; and Fig. 4 is a detail view of the locking mechanism.

Cash registers as heretofore constructed have consisted of sale registering mechanism operated by a series of keys, each key representing a different amount, the arrangement being such that to register a sale, the key bearing the number corresponding to the amount of the sale would be operated, and registering mechanism operated thereby to register the proper amount. In certain machines of this class, in addition to the sale registering mechanism there has been provided a total registering mechanism to register the total sales, and in such machines, as well as in all other cash registers, after each actuation of the register keys the sale mechanism is returned to its original position, canceling the prior registration, the total register, however, remaining unaffected by such return movement. Such machines are very convenient for the purpose of keeping an accurate registration of all cash sales made; and if all money taken in for cash sales is deposited in the cash drawer the total registration of the machine will correspond with the total cash in the drawer; but it frequently happens that it is necessary to take money from the cash drawer, and then the amount indicated by the total register does not correctly represent the cash on hand; furthermore, it is desirable that means should be provided for registering credit sales and cash paid out; that is, cash taken from the money drawer. The combination in one machine of the above mentioned item registers necessitates such a construction as will provide for both the positive and negative actuation of the cash-on-hand register, inasmuch as when money is paid out it is necessary to subtract the amount paid out from the indication of the cash-on-hand register.

So far as I am aware, no register heretofore constructed has contained mechanism which will accomplish the above mentioned registrations, and to provide such a machine is the principal object of my present invention.

Another object of my invention is to provide a cash register with a number of item registers, and with means whereby the different item registers may be readily thrown into or out of operative connection at the pleasure of the operator.

Another object of my invention is to provide such a machine which will be compact in form and simple in construction and operation, and which may be readily attached to an ordinary cash register.

I accomplish these objects as hereinafter specified and as illustrated in the drawings. That which I regard as new will be set forth in the claims.

In the accompanying drawings I have shown my improved machine as attached to a cash register of the class shown and described in Letters Patent No. 393,089, granted to J. J. Webster, November 20, 1888; the registering in this machine being accomplished by means of a graduated lever operating upon a ratchet wheel, which lever is operated by a series of keys engaging the lever at different points so that each key has a different leverage upon the operating lever, and consequently no two keys will move the operating lever the same distance, since all the keys have the same motion. My improved machine may, however, be applied to cash registers and adding machines of other makes by slightly modifying it.

Referring to the drawings,—5 indicates a cash register, of which 6—6 are the operating keys, arranged in two banks, as shown in Figs. 2 and 3. The keys 6 are mounted upon a rock shaft 7 journaled in the frame 8 of the register, as shown in Fig. 4, and are provided at their outer ends with finger pieces 9. The rear ends of the keys 6 extend to the back of the frame 8 and under a graduated lever 10, as shown in Fig. 1. The lever 10 is pivoted at one end upon a stud 11 supported by a standard 12, as shown in Figs. 1 and 3. The stud 11 also carries a ratchet wheel 13, the teeth of which are adapted to be engaged by a pallet 14 pivotally connected to the lever 10 by a pin 15, as best shown in Fig. 1. The pallet 14 is held in engagement with the teeth of the ratchet wheel 13 by a suitable spring. By this construction, when one of the keys 6 is depressed the inner portion thereof will engage the under side of the lever 10, and raise it a greater or less distance, depending upon the point at which the key strikes said lever. This will partially rotate the ratchet wheel 13. The lever and ratchet 13 are of course adjusted so that the actuation of any key will rotate the ratchet 13 through the proper arc.

16 indicates a gear wheel, which is mounted upon the stud 11 beside the ratchet wheel 13, to which it is secured.

17 indicates a shaft pivotally mounted transversely of the frame 8 of the machine, which shaft is movable longitudinally in its bearings.

18 indicates an elongated pinion which is mounted upon the shaft 17, and is adapted to mesh constantly with the gear 16.

19 indicates a spring mounted upon the shaft 17, one end of said spring bearing against a portion of the frame 8, the other end of the spring bearing against a collar 20 mounted upon the shaft 17. The tension of the spring 19 is such as to normally hold the shaft 17 in its retracted position, as shown in Fig. 3.

21 indicates a rock shaft mounted in suitable bearings at the back of the frame 8 of the register, as shown in Fig. 3. 22 indicates an arm which is secured upon said shaft 21, and is connected to the rear end of the shaft 17, as shown in Figs. 2 and 3. The arrangement is such that by rocking the shaft 21 the shaft 17, through the arm 22, will be moved longitudinally in its bearings.

23 indicates an arm which is also secured at one end to the shaft 21, preferably at the opposite end of said shaft from the arm 22. The arm 23 depends from the shaft, and is provided with an inclined lower edge 24, as shown in Fig. 3.

25 indicates a second arm, which is in general similar to the arm 23, and is similarly mounted upon the shaft 21. The arm 25 is provided with an inclined lower edge 26, which edge is of a different inclination than that of the edge 24 of the arm 23.

27 indicates a key for registering amounts paid out, which key is similar to the keys 6, and is similarly mounted, except that it is located at the end of the register and does not engage the lever 10 when operated. The inner end of the key 27 is adapted to engage the inclined edge 26 of the arm 25, the arrangement being such that by depressing the key 27 the arm 25 will be thrown outward, rocking the shaft 21 and shifting the shaft 17 in its bearings, as above described.

28 indicates a key for registering credit sales, which key is similar to the key 27, and is similarly mounted except that it is adapted to engage the inclined edge 24 of the arm 23, the arrangement being such that by operating the key 28 the arm 23 will be thrown backward and the shaft 21 will be rocked a less amount, and the shaft 17 moved in its bearings a less distance than when the key 27 is operated.

29—30—31—32 indicate a number of pinions which are mounted upon the shaft 17 at different points, as shown in Fig. 3.

33—34—35—36 indicate a number of gears or register wheels, which are mounted at different points upon a shaft 37, which is journaled in suitable bearings in the frame of the machine in a position parallel to the shaft 17. Each of the gears 33—34—35—36 carries a flange 38, the surface of which is marked off to indicate different amounts, from five cents to five dollars. As illustrated, the register wheel 33 registers cash sales, the wheel 34, credit sales, the wheel 35, amount paid out, and wheel 36 cash on hand. The position of the different wheels may be varied, however, by correspondingly changing the operating mechanism.

39 indicates a shaft, which is mounted in the upper portion of the frame 8 of the register and is parallel to the shaft 17. The shaft 39 is longitudinally movable in its bearings, and is normally held in its forward position by a spring 40, as shown in Fig. 3.

41 indicates a pinion which is mounted upon the shaft 39.

42 indicates a shaft which is parallel to the shaft 39, and is suitably journaled in the frame of the register near the shaft 39. The shaft 42 carries a pinion 43, which meshes with the register wheel 35, as shown in Fig. 3. The pinion 41 is adapted to be moved into mesh with the pinion 43 by the longitudinal movement of the shaft 39, and its length is such that when so moved it will also be in engagement with the register wheel 36. The pinion 41, as shown, is in mesh with the register wheel 36 when the shaft 39 is in its normal position, but it is then merely an idler.

44 indicates a rocking lever, which is pivoted upon a support 45 and extends from the forward end of the shaft 17 to the forward end of the shaft 39, the arrangement being such that when the shaft 17 is moved forward the lever 44 will be rocked, thereby moving the shaft 39 back, and bringing the pinion 41 into mesh with the pinion 43.

The pinion 29 upon the shaft 17 is normally in engagement with the cash sale register wheel 33; and the pinion 32 is normally in engagement with the cash on hand register wheel 36, as shown in Fig. 3, the pinions 30—31 being then idle. When the credit sale key 28 is operated the lever 17 will be moved its shorter distance, as hereinbefore described, and the pinion 30 is so placed that when the shaft 17 is so moved said pinion will move into mesh with the register wheel 34. Such movement of the shaft 17 will at the same time move the pinions 29 and 32 out of engagement with their respective register wheels, and the pinion 31 will remain idle. The lever 44 will be slightly rocked by the movement of the shaft 17, but it will not be moved sufficiently to move the pinion 41 into mesh with the pinion 43. The mechanism will now be in such position that when any one of the register keys 6 is operated the credit sale register wheel will be rotated the proper amount, but none of the other register wheels will be actuated. When the paid out key 27 is operated the shaft 17 will be moved its greater distance, moving the pinion 31 into mesh with the register wheel 35, the pinion 30 moving beyond the register wheel 34, and the pinions 29 and 32 moving out of mesh with their respective register wheels. At the same time the rocking lever 44 will be actuated sufficiently to move the pinion 41 into mesh with the pinion 43. Now by operating any of the register keys 6 the paid out register wheel will be rotated the proper distance to indicate the amount paid out, and the cash on hand register wheel will be rotated the same distance in the reverse direction, thereby subtracting from the amount previously indicated the amount paid out. The cash on hand register will therefore at all times indicate the actual cash on hand. The cash sale and credit sale register wheels will of course not be operated, as the pinions which operate them will be idle. As soon as the paid out key is released the spring 19 will retract the shaft 17, returning the mechanism to its normal position.

In order to lock the shaft 17 against accidental backward movement when either of the special keys 27—28 is operated, I provide one of the arms 23 or 25 with a laterally projecting pin 46, which pin is adapted to be engaged in notches 47—48 formed in a pawl 49 pivoted to the frame of the machine. The arrangement is such that by the actuation of the credit key 28 the pin 46 will fit into the notch 48, and when the arms 23—25 are actuated by the paid out key 27 the pin 46 will enter the notch 47, and thereby the arms 23—25 will be held back, and backward movement of the shaft 17 be thereby prevented. To release the arms 23—25 a rocking lever 50 is provided, which lever is pivotally mounted, by a pin 51, upon the frame of the register, in such position that one of its arms is adapted to strike the under side of the pawl 49, thereby lifting it sufficiently to permit the arms 23—25 to swing to their normal position. The lever 50 is operated by a universal lever 52, which is mounted upon the shaft 7, and extends over all the register keys in such position that when any one of the keys is operated the free edge of the lever 52 will be lifted.

53 indicates a pawl pivoted centrally by a pin 54 to one side of the lever 52, in such position that the rear end of said pawl will be adapted to project slightly over the forward end of the lever 50. The forward end of said pawl is adapted to rest upon a pin 55 carried by the lever 52. The arrangement is such that when the lever 52 is raised, the rear end of the pawl 53 will move above the forward end of the lever 50. When the lever 52 is moved downward again, the rear end of the pawl 53 will press down upon the forward end of the lever 50, thereby rocking said lever and causing it to strike the pawl 49 and release the arms 23—25. A spring or other suitable device is provided for returning the lever 52 to its normal position upon the register keys.

The construction above described is one of a number of constructions which may be used for the purpose stated, and I do not wish to limit myself to the use of a locking device of the particular construction shown.

In Fig. 1 I have shown one method of transferring the amounts from the register wheels 33—34—35—36 to other wheels, so that the mechanism will not have to be frequently reset.

In the construction shown I provide what may be called a total registering wheel 56, which is mounted upon a shaft 57 parallel to the shaft 37.

58 indicates a rocking lever, which is also mounted upon the shaft 57. The lever 58 carries a pallet 59 adapted to engage the teeth of the register wheel 56, in engagement with which it is held by a spring 60, as shown in Fig. 1.

61 indicates a spring, the lower end of which is connected to one end of the lever 58, its other end being connected to a suitable support. The spring 61 acts to exert an upward pressure upon the lever 58, holding it substantially in the position shown in Fig. 1. A suitable stop is provided to limit the upward motion of the lever 58. The end of the lever 58 opposite to that which carries the pallet 59 projects slightly beyond the periphery of the register wheel, from which the wheel 56 is to receive the total amounts, and, for convenience, the wheel shown in Fig. 1 as actuating the wheel 56 will be considered to be the cash sale wheel 33. The lever 58 is actuated by means of a pin 62 carried by the wheel 33. The arrangement is such that at each complete rotation of the wheel 33 the pin 62 will engage the lever 58 and rock it, moving the pallet 59 back the space of one tooth, the pin 62 then passing beyond the end of the lever 58. As soon as the lever 58 is released the spring 61 will rock the lever 58 in the opposite direction, thereby rotating the wheel 56 the space of one tooth. To prevent accidental reverse rotation of the wheel 33 a pawl 63 is provided, which engages the teeth of the wheel 33, and permits it to rotate only in a forward direction. The pawl 63 is held in engagement with the wheel 33 by a spring 64, as shown in Fig. 1.

The mechanism shown for transferring the totals from the registering wheels is intended for use only with the cash sale, credit sale, and paid out registering wheels, it not being adapted for use with the cash on hand mechanism, for the reason that no mechanism is shown for reversing the total wheel, as would be necessary when the cash on hand wheel was reversed for subtractions, as above described. I have, however, designed a transferring apparatus which will be adapted for use with any of the registering wheels shown, and that device will form the subject matter for a subsequent application.

In the machine herein described and illustrated I have shown mechanism for registering four different items, but I do not wish to limit myself to the use of all the above mentioned item registers together, since certain features of my invention may be incorporated in a register having only cash-on-hand and cash-sale item registers, or cash-on-hand and cash-paid-out item registers, or various other combinations of the different item registers may be incorporated in a single machine.

The item registers which are incorporated in the machine herein described are those which seem to me most likely to be of value, and I have therefore described the best form at present known to me in which all of said item registers could be incorporated in one machine. Furthermore, in addition to the mechanism for registering the four items shown, additional registering mechanism may be used, each additional mechanism being adapted to be thrown into and out of operation at the will of the operator.

I do not wish to limit myself to the details of construction herein shown, nor, in the application of my improved machine to any particular register or adding machine. The construction shown is, however, the simplest and best at present known to me, and it is therefore my preferred form.

That which I claim as my invention, and desire to secure by Letters Patent, is—

1. The combination with three or more registering devices, of a single series of keys adapted to operate said registering devices, and means for simultaneously throwing two of said registering devices into or out of operative connection, substantially as described.

2. The combination with devices adapted to register three or more items, and an operating device common to said registering devices, of means for simultaneously throwing two of said registering devices into or out of operative engagement and at the same time throwing another of said registering devices out of or into operative engagement, substantially as described.

3. The combination with devices adapted to register three or more items, and an operating device common to said registering devices, of means for simultaneously throwing two of said registering devices into or out of operative engagement and at the same time throwing another of said registering devices out of or into operative engagement, a single series of keys for operating the different registering devices, and one or more keys for effecting the different engagements of said registering devices, substantially as described.

4. The combination with three or more registering wheels adapted to be rotated in the same direction, of actuating mechanism common to the different register wheels, and means for simultaneously operatively connecting two of said wheels with said actuating mechanism, while disconnecting another of said wheels, substantially as described.

5. The combination with three or more registering devices, of actuating mechanism common to the different registering devices, and means for simultaneously operatively connecting two of said registering devices with the actuating mechanism, while disconnecting another of said registering devices, substantially as described.

6. The combination with three or more registering devices, of mechanism for operating said registering devices, said operating mechanism being normally in operative engagement with two of said registering devices, and means for throwing the different registering devices into operative engagement at will, substantially as described.

7. The combination with two or more register wheels adapted to register different items, a shaft, a series of pinions mounted thereupon and arranged to be moved into operative engagement with the different register wheels by the shifting of said shaft, means for shifting said shaft, a series of operating keys arranged to operate the different register wheels by means of said pinions and mechanism for operating the shaft from the keys, substantially as described.

8. The combination with a plurality of registering wheels, and register keys, of means for rotating said wheels positively for purposes of addition, and means for reversing the rotation of one of said wheels for purposes of subtraction, and simultaneously positively rotating certain other of said wheels by operating said keys, substantially as described.

9. The combination with a plurality of registering wheels adapted to rotate forward, register-keys, and mechanism for rotating said wheels forward, of means whereby an equal reverse rotation of one of said wheels simultaneously with the forward rotation of certain other of said wheels may be effected by operating said keys, substantially as described.

10. The combination with a plurality of registering device, and mechanism for operating said registering devices positively for purposes of addition, means for causing a reverse operation of certain of said registering devices simultaneously with the positive operation of certain other of said registering devices, and a single series of keys for operating said registering devices, substantially as described.

11. The combination with a plurality of registering devices adapted to be actuated in the same direction, of register-actuating mechanism common to the different registering devices for actuating them in the same direction, and means for imparting a reverse actuation to one of said registering devices simultaneously with and equal to the forward actuation of certain other of said registering devices, substantially as described.

12. The combination with a plurality of register wheels adapted to register different items, of operating keys, an operating train movable into engagement with the different register wheels, so that the different register wheels may be operated by a single series of operating keys, means for shifting said train, and means for reversing the rotation of certain of said wheels, substantially as and for the purpose specified.

13. In a cash register, the combination with cash-sale, cash-paid-out and cash-on-hand registering devices, of means for throwing said cash-sale and cash-on-hand registering devices into operative engagement simultaneously whereby they may be operated at the same time, means for throwing said cash-sale registering device out of operative engagement and for throwing said cash paid out registering device into operative engagement, and means for reversely operating said cash-on-hand registering device simultaneously with the positive operation of said cash-paid-out registering device, substantially as described.

14. In a cash-register, the combination with cash-sale, cash-on-hand, cash-paid-out and credit-sale registering devices, of a single series of operating keys for operating the different registering devices, means for positively operating the cash-sale and cash-on-hand registering devices simultaneously, means for positively operating the cash-paid-out registering device and simultaneously reversely operating the cash-on-hand registering device, and means for throwing out of operative position the cash-sale, cash-on-hand and cash-paid-out registering devices and for simultaneously throwing the credit-sale registering device into operative position, substantially as described.

15. The combination with a series of register wheels, of a shaft, a series of pinions mounted upon said shaft and movable into engagement with the different register wheels by the longitudinal movement of said shaft, means for shifting said shaft longitudinally whereby said pinions may be moved into engagement with the respective wheels at the will of the operator, and means for effecting the reverse rotation of one of said register wheels simultaneously with the forward rotation of certain other of said wheels, substantially as described.

16. A cash register having cash-on-hand and cash-paid-out registering devices, register keys, and means for operating said registering devices relatively to each other by operating said keys so that the sum of the readings of said registering devices will indicate the total cash received, substantially as described.

17. A register having cash-sale and cash-on-hand registering devices, and means for operating said devices relatively to each other so that the difference between the readings of said register devices will indicate the total cash paid out, substantially as described.

18. A cash register having devices for registering cash-on-hand, cash-sales, and cash-paid-out, and having a single series of register keys for operating the different item-registering devices and means whereby the said registering devices are operated so that their indications bear the proper relation to each other, substantially as described.

19. A cash-register having a single series of register keys, and devices for registering cash-on-hand and cash-paid-out, such registering devices being operated by the same series of register keys, a controlling key for controlling the registration of the register, and means whereby the said registering devices are operated, so that their indications bear the proper relation to each other, substantially as described.

20. The combination with two or more independent registering devices, register-keys, and mechanism whereby by operating said keys said registering devices may be operated positively for purposes of addition, of means for causing a reverse operation of certain of said registering devices simultaneously with the positive operation of certain other of said registering devices, substantially as described.

21. A cash register having devices for registering cash-on-hand, cash-sales and cash-paid-out, and means for operating said registering devices relatively to each other, so that the sum of the readings of the cash-on-hand and cash-paid-out registering devices will equal the cash-sale registering device, substantially as described.

22. In a register, the combination with a series of register wheels, of longitudinally movable shafts, as 17, and 39, pinions carried by said shafts adapted to be moved to place certain of said register wheels in operative engagement by the longitudinal movement of said shafts, means for moving one of said shafts longitudinally, and means for simultaneously moving the other of said shafts in a reverse direction, substantially as described.

23. In a register, the combination with a series of register wheels, of two shafts 17 and 39, pinions carried by said shafts adapted to be moved to place certain of said register wheels in operative engagement by the longitudinal movement of said shafts, and a lever 44 extending opposite the ends of said shafts 17 and 39, whereby when one of said shafts is moved longitudinally the other of said shafts will be moved in an opposite direction, substantially as described.

24. The combination with two or more register wheels, and an adjustable shaft 17, of pinions mounted upon said shaft, said pinions being adapted to be moved into mesh with the different register wheels by different adjustments of said shaft, register keys, means for rotating said shaft by operating said register keys, and means for shifting said shaft to throw the different wheels into operative engagement, substantially as described.

25. The combination with a plurality of registering mechanisms, actuating devices therefor, and means for positively actuating said registering mechanisms by operating said actuating devices, of means whereby, by operating said actuating devices, one of said registering mechanisms may be positively actuated simultaneously with the reverse actuation of another of said registering mechanisms, substantially as described.

26. The combination with two registering devices adapted to be actuated in the same direction, of a series of register-keys common to the different registering devices, so that by actuating said keys said registering devices may be actuated in the same direction simultaneously, and means whereby by operating said register-keys one of said registering devices may be reversely actuated, substantially as described.

27. In a cash register, the combination with a cash sale registering device, and a cash on hand registering device, of mechanism for operating said registering devices simultaneously, means for throwing said cash sale registering device out of operation, and means for reversing the rotation of said cash on hand registering device, substantially as described.

28. In a cash register, the combination with a cash sale registering device, and a cash on hand registering device, of a series of operating keys adapted normally to operate said cash sale and cash on hand registering devices simultaneously, reversing mechanism whereby said cash on hand registering device may be reversely operated for purposes of subtraction, and means for throwing said cash sale registering device out of operative engagement, substantially as described.

29. In a cash register, the combination with cash sale, cash paid out, and cash on hand registering devices, said registering devices being adapted to be operated by the same register keys, of keys for operating said registering devices, means for throwing said cash sale and cash on hand registering devices into operative engagement simultaneously whereby they may be operated together, means for throwing said cash sale registering device out of operative engagement and for simultaneously throwing said cash paid out registering device into operative engagement, and means for throwing said cash on hand registering device into position to be operated in a reverse manner simultaneously with the throwing of the cash paid out registering device into operative position, substantially as described.

30. In a cash register, the combination with cash sale, cash paid out, and cash on hand registering wheels, a shaft 17, pinions 29, 31 and 32 mounted upon said shaft, said pinion 31 being movable into engagement with the cash paid out wheel 35, said pinions 29 and 32 being in normal engagement with the wheels 33 and 36 respectively, a pinion 43 in engagement with the wheel 35, and pinion 41 in engagement with the wheel 36 and movable into engagement with the pinion 43, of operating keys, means for rotating the shaft 17 by operating said keys, means for shifting the shaft 17 to move the pinion 31 into engagement with the wheel 35, and means for simultaneously moving the pinion 41 into engagement with the pinion 43, substantially as described.

CHARLES J. RYBERG.

Witnesses:
JOHN L. JACKSON,
JULIA M. BRISTOL.